United States Patent [19]

Wilson

[11] 4,420,321
[45] Dec. 13, 1983

[54] PROCESS FOR REMOVAL OF CARBON BLACK FLOC ASSOCIATED WITH WET-PROCESS PHOSPHORIC ACID IN THE PRODUCTION OF FERTILIZERS

[75] Inventor: Joseph F. Wilson, Bartlesville, Okla.

[73] Assignee: Phillips Petroleum Company, Bartlesville, Okla.

[21] Appl. No.: 429,739

[22] Filed: Sep. 30, 1982

[51] Int. Cl.$^3$ .................. C05B 11/00; C05B 7/00; C01B 25/16
[52] U.S. Cl. ................................. 71/43; 71/34; 423/310; 423/313; 423/321 R
[58] Field of Search ............... 423/316, 317, 319, 320, 423/321 R, 310, 313; 71/43, 34

[56] References Cited

U.S. PATENT DOCUMENTS 2,968,528  1/1961  Tuttle et al. ............... 423/321 R
3,044,855  7/1962  Young ........................ 423/316
3,988,140  10/1976  Burns ......................... 423/310

FOREIGN PATENT DOCUMENTS 44-14692  6/1969  Japan ........................ 423/321 R

OTHER PUBLICATIONS

Achorn et al., "Commercial Uses of the Pipe Reactor Process for Production of High Polyphosphate Liquids", Solutions, Mar./Apr. 1973, pp. 44, 46, 48, 52.

*Primary Examiner*—Gregory A. Heller

[57] ABSTRACT

Black carbonaceous floc in wet-process phosphoric acid is removed by contact with an oxidizing agent during the neutralization step with ammonia. In an embodiment the black floc is removed in liquid fertilizers derived from wet-process phosphoric acid by reaction with an oxidizing agent at high temperatures.

The oxidizing agent is preferably nitric acid.

5 Claims, 2 Drawing Figures

PROCESS FOR REMOVAL OF CARBON BLACK FLOC ASSOCIATED WITH WET-PROCESS PHOSPHORIC ACID IN THE PRODUCTION OF FERTILIZERS

BACKGROUND OF THE INVENTION

This invention relates to carbon black floc that is associated with wet-process phosphoric acid. In one of its aspects this invention relates to removal of carbon black floc associated with wet-process phosphoric acid. In another of its aspects this invention relates to the production of liquid fertilizer by the neutralization of wet-process phosphoric acid. In still another aspect this invention relates to producing fertilizer of clear or near-clear appearance from wet-process phosphoric acid.

In the process of reacting calcium phosphate rock with sulfuric acid and the manufacture of wet-process phosphoric acid the organic matter is carried over in the phosphoric acid. This results in a concentration of carbon floc both in the wet-process phosphoric acid and in products made from reacting the wet-process phosphoric acid such as liquid fertilizer which is made by neutralizing the wet-process phosphoric acid with ammonia. Unfortunately, even a very low concentration of the carbon floc such as the amount 0.4 weight percent concentration often found in liquid fertilizer, is sufficient to give both an objectionable color and to cause problems associated with settling of floc during periods of storage.

It is therefore an object of this invention to provide a method for removing carbon floc from wet-process phosphoric acid. It is another object of this invention to provide a method for removing carbon floc from liquid fertilizer produced by neutralization of wet-process phosphoric acid with ammonia. It is another object of this invention to provide a method for removing carbon floc as liquid fertilizer is being produced from wet-process phosphoric acid. It is still another object of this invention to provide liquid fertilizer of clear or near-clear appearance.

Other aspects, objects and the various advantages of this invention will become apparent upon reading the specification and the appended claims.

STATEMENT OF THE INVENTION

According to the invention, a method is provided for removing carbon floc from wet-process phosphoric acid during the conversion of the wet-process phosphoric acid to liquid fertilizer by neutralization with ammonia in which wet-process phosphoric acid is contacted with ammonia at an elevated temperature in the range of about 500° to about 700° F. in the presence of an oxidizing agent thereby oxidizing the carbon floc.

In an embodiment of the invention liquid fertilizer that has been produced by neutralization of wet-process phosphoric acid with ammonia and which contains carbon floc can be treated by the process of the invention, i.e., contact of the ammoniated phosphates with an oxidizing agent for removal of at least a part of the carbon floc.

Materials that can be suitably treated by the process of this invention include wet-process phosphoric acid and products made therefrom, notably liquid fertilizers made by neutralization of wet-process phosphoric acid with ammonia, which contain carbon floc as a contaminant.

The reaction of phosphoric acid with ammonia to produce liquid fertilizer is well-known in the art. The preferred means for carrying out this reaction in recent years has become the contact of the reactants in the pipe reactor process. Typically, a pipe reactor is made from 4 to 6-inch, stainless steel or preferably titanium, schedule 40 pipe and consists of a mixer T section with superphosphoric acid being fed into the base of the horizontal mixer T while ammonia is added vertically through a pipe passing through the mixer T opening in a position about 2-inches above the cross of the T. Attached to the upper end of the mixer T is a vertical section of pipe topped by a elbow, a section of horizontal pipe, another elbow and a downcomer section for discharge. In most commercial applications hot ammonium polyphosphate melt is discharged under the surface of the liquid level of a mix tank or holding vessel.

The neutralization reaction carried out in the pipe reactor is exothermic so that the temperature of the hot ammonium polyphosphate melt discharged from the reactor is in a range of about 400° to about 700° F. One of the problems associated with contacting wet-process phosphoric acid in the presence of an oxidizing agent is that even though a clear product can be obtained at a given reaction temperature subsequent treatment of the clear product at a higher temperature can cause the formation of dark color which is theorized to be caused by an incomplete removal of carbonaceous contaminant at lower levels of reaction temperature. The present invention, therefore, takes advantage of the relatively high level of reaction temperature for contact of the oxidizing agent with carbonaceous floc.

In the process of this invention the contacting of reactants is carried out in the pipe reactor exactly as described above for the commercial production of fertilizer with the addition that the wet-process phosphoric acid or derivative containing carbon floc is mixed or pre-mixed with an oxidizing agent in an amount sufficient to remove at least a part, preferably all, of the carbon floc at the temperature of the neutralization reaction. The amount of oxidizing agent needed for the process will generally fall within the range of about 0.5 mol oxidizing agent/mol carbon floc to about 4 mols oxidizing agent/mol carbon floc, preferably about 1.0 mol oxidizing agent/mol carbon floc to about 2.0 mols oxidizing agent/mol carbon floc, but it should be understood that this invention requires use of a sufficient amount of oxidizing agent to provide a colorless solution by oxidation of the black contaminating colorant. The necessary amount of oxidant can fall outside of the general ranges given above.

Materials suitable for use as oxidizing agents in this process can be chosen from among nitric acid; halides such as chlorine, bromine, iodine, water soluble salts of hypohalites such as sodium hypochlorite; hydrogen peroxide; sodium dichromate; potassium permanganate; and ammonium nitrate. At present the preferred oxidizing agent is nitric acid.

The following examples illustrate the removal of carbon floc from wet-process superphosphoric acid on neutralization with ammonia in the presence of oxidizing agent and the removal of carbon floc from liquid fertilizer containing carbon floc. These examples should be taken as illustrative and not as being restrictive.

EXAMPLE I

Figure 1:
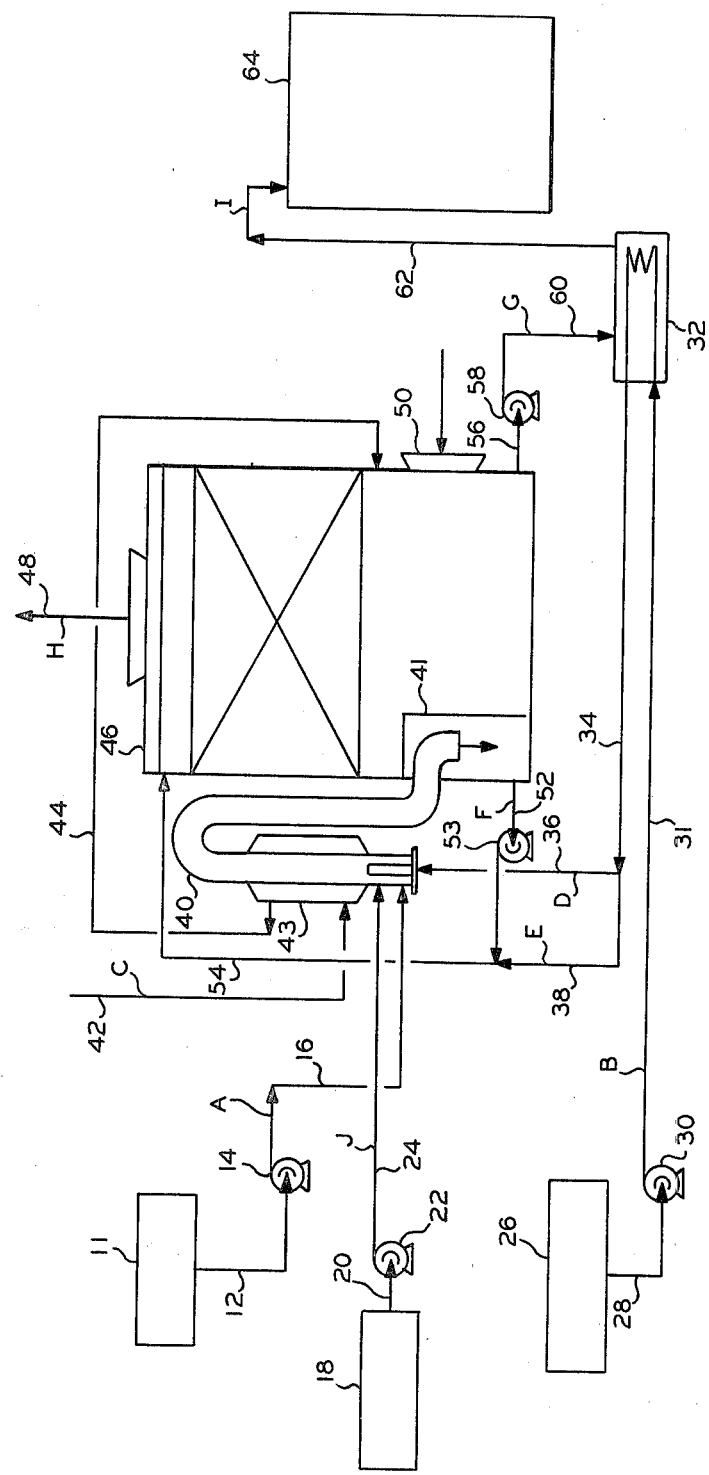
FIG. 1 is a line drawing representing a process for producing fertilizer solution using the method of this invention for oxidizing carbonaceous contaminants.

Refer to FIG. 1 which shows a typical process flowsheet for a pipe reactor 10-34-0 fertilizer solution plant using the inventive feature of the addition of a nitric acid oxidizer agent just downstream of the entry of the superphosphoric acid (70 wt % $P_2O_5$) into the base of the inverted U type pipe reactor. Solution 10-34-0 contains 10 wt % nitrogen, 34 wt % phosphorous expressed as $P_2O_5$, and no potassium. Capitalized letter represent material balances flows in Table 1, which follows this process description.

Superphosphoric acid of 70 wt % $P_2O_5$ acid is stored in reservoir 11 and transferred through conduit 12 to pump 14. The phosphoric acid passes through conduit 16 to inverted U pipe reactor 40. Suitable oxidizing agent, here nitric acid, is stored in vessel 18 and passes via conduit 20 to pump 22 which discharges via conduit 24 to a point just downstream of the entry of the phosphoric acid of conduit 16. Liquid ammonia is stored in tank 26 and passes via conduit 28 to pump 30 to vaporizer 32 via conduit 31 where ammonia is vaporized. The vaporous $NH_3$ passes via conduit 34 and 36 to a sparge pipe in the base of reactor 40 where it mixes just downstream of the mixed phosphoric acid black with carbon floc and the nitric acid mixture entering base of said reactor 40. The hot ammonium phosphate melt from reactor 40 is fed to a weir 41 containing 10-34-0 product to maintain high polyphosphate content by rapid cooling. The reaction is exothermic. To reduce reactor skin temperature to avoid internal scale build-up, cooling water entering conduit 42 passes through a jacketed section 43 around reactor 40 and passes as hot water via conduit 44 into packed spray tower 46. A small portion of the ammonia passes via conduit 38 and 54 into spray tower 46 with product 10-34-0 fertilizer solution for pH adjustment from conduit 52 and pump 53. Air enters packed spray tower 46 at entry 50 and exits said tower at exit 48. Warm product passes via conduit 56 to pump 58 and via conduit 60 to ammonia vaporizer 32 where said 10-34-0 fertilizer solution is cooled and passes via conduit 62 to product storage 64. Table I represents a typical material balance given in tons per stream hour. A calculated amount of nitric acid oxidizer is given in stream J of Table I. As explained earlier other capitalized letters represent typical flow values for a 10 ton per hour 10-34-0 fertilizer solution plant.

As shown in the accompanying material balance Table I for a production of 10 tons per hour of 10-34-0 fertilizer solution, the amount of nitric acid required is calculated as 0.102 tons/hour of $HNO_3$ on a 100% $HNO_3$ basis as given in stream J. The basis for this calculation was to remove by oxidation 0.4 wt % carbon impurity in the superphosphoric acid of 70 wt % $P_2O_5$ shown in column A of the material balance. The basis for such a calculation is as follows:

An assumed reaction of:

$$2HNO_3 + 2C \rightarrow N_2O + H_2O + 2CO_2$$

This is considered to be one of the more probable reactions since no colored $NO_2$ was observed in a simulated test to be described in Example II. The tons per hour of oxidant $HNO_3$ required on a 100% basis is equal to $4.857 \dfrac{\text{tons}}{\text{hour}}$ total phosphate times 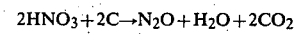

$\dfrac{0.4}{100} \dfrac{\text{wt. parts of carbon impurity}}{\text{wt. parts of phosphate feed}}$ to be oxidized times 1 mol $HNO_3$ times 63.02 lbs/mol of $HNO_3$ divided by 1 mol of carbon times 12.0 lbs/mol of carbon which equals 0.102 tons per hour of $HNO_3$ (on 100% basis).

TABLE I

| Material Balance Point | A | B | C | D | E | F | G | H | I | J |
|---|---|---|---|---|---|---|---|---|---|---|
| $P_2O_5$ TPH | 3.4 | | | | | 36.0 | 12.92 | | 3.4 | |
| $NH_3$ TPH | | 1.216 | | .730 | .486 | 12.39 | 4.63 | | 1.216 | |
| $H_2O$ TPH | | | 7.248 | | | 37.65 | 14.92 | 3.21 | 3.927 | |
| Other TPH | 1.457 | | | | | 13.96 | 5.53 | | 1.457 | |
| Total TPH | 4.857 | 1.216 | 7.248 | .730 | .486 | 100.0 | 38.0 | 3.21 | 10.0 | 0.102 |
| GPM | 10.0 | 8.11 | 28.98 | | | 287.0 | 109.0 | 13.28 | 28.76 | 0.4 |
| Temp °F. | 135.0 | 80.0 | 60.0 | | | 150.0 | 130.0 | | 90.0 | 80.0 |
| Sp. Gr. | 1.93 | 0.6 | 1.0 | | | | | | 1.39 | 1.37 |
| pH | | | | | | | 6.0 | | 6.0 | |
| % Conversion | 28.0 | | | | | 75.0 | 75.0 | | 75.0 | |
| % $P_2O_5$ | 70.0 | | | | | 36.0 | 34.0 | | 34.0 | |
| $HNO_3$ TPH/100% Basis | | | | | | | | | | 0.102 |

*TPH is ton/hour

The heart of the process consists of an inverted U type pipe reactor wherein 70 wt. % $P_2O_5$ superphosphoric acid contaminated with 0.4 wt % carbon floc is pumped into the base of the reactor followed by oxidizer such as nitric acid being pumped into either the superphosphoric acid or injected just downstream of the superphosphoric acid into the reactor. Vaporized ammonia is sparged into the base of the reactor in a sparge pipe the end of which typically is located downstream of the injection of superphosphoric and nitric acids. A large exothermic heat of reaction between the ammonia vapor and superphosphoric acid raises the temperature of the reaction products to about 650° F. This high temperature facilitates the oxidation of the carbonaceous impurity in the superphosphoric feed with the nitric acid oxidizer. The reaction of the nitric acid and carbon is also highly exothermic, about 144,000 cal/g mol reacted. This exothermic heat is calculated to give about 50° F. increase in reactor effluent heat or to raise the reaction temperature to about 700°

F. This in turn yields high polyphosphate content in the 10-34-0 fertilizer solution. Complete oxidation of the carbonaceous impurity occurred in the wet-process superphosphoric acid feed to give a clear, colorless 10-34-0 fertilizer. To demonstrate oxidation of the carbon, a laboratory test was made as described in Example II.

EXAMPLE II

An experimental test was made to simulate the oxidation of carbonaceous impurity in the superphosphoric acid (70 wt % acid) of a commercial plant as described in Example I. Because of the high capacity of the pipe reactor to produce 10-34-0 fertilizer solution it was realized that a pipe reactor even made of ¼ inch diameter tubing would produce about one ton per day of fertilizer solution in the laboratory. Even very small tubing for the reactor would, therefore, require a costly experimental system of storage and process equipment to scale down in order to demonstrate the oxidation of the carbonaceous impurity in the superphosphoric acid.

Figure 2:
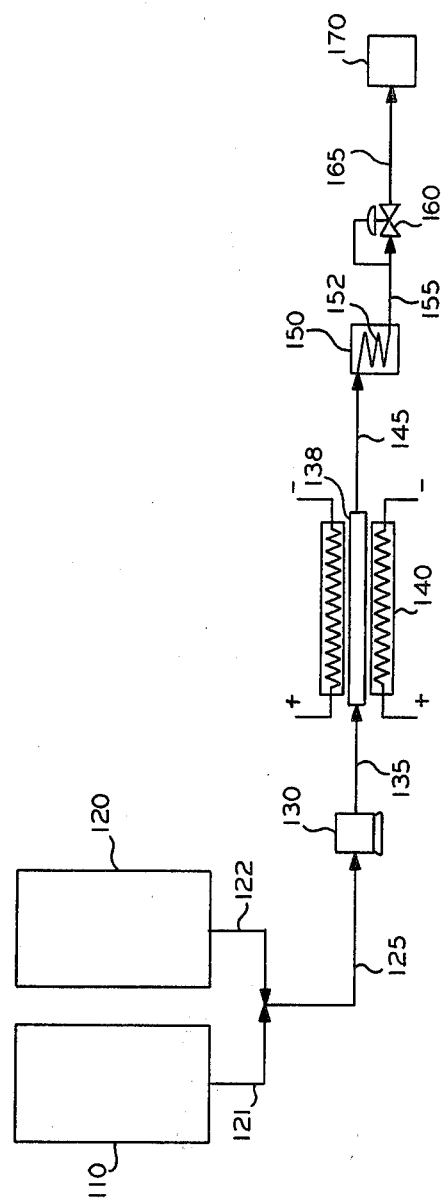
FIG. 2 is a line drawing representing a process for oxidation of carbonaceous impurity in 10-34-0 liquid fertilizer.

In order to circumvent a costly "pilot plant" test, a laboratory process was built as shown schematically in FIG. 2 to simulate the oxidation of carbon impurities in the wet-process superphosphoric acid feed.

This experimental system consisted of a gravity flow reservoir 110 containing the "black" fertilizer product 10-34-0 solution and the stoichiometric amount of nitric acid required to oxidize the black carbonaceous impurity in the 10-34-0 product. A second gravity flow reservoir 120 containing water was adjacent to reservoir 110. Water or black product solution containing oxidizer was fed from conduits 122 or 121 to feed pump 130 from conduit 125. Even though pump 130 was capable of producing 5000 psig maximum discharge pressure, this experiment was conducted at a system pressure of 400 psig. Pump 130 pumped feed through conduit 135 to a 316 stainless steel reactor tube 138 enclosed in an electric heater furnace 140 capable of heating the contents of this flow system to about 700° F. and 800 psig. Reactor effluent exited reactor 138 through conduit 145 to a quench water bath 150 containing a 316 stainless steel coil 152 which passed the clarified reactor product through conduit 155 to a back pressure regulator control system 160 and then via conduit 165 to product receiver 170.

An initial test run feeding only water from reservoir 120 through the experimental process was made for about 10 minutes followed by switching to reservoir 110 containing black fertilizer solution and the nitric acid oxidizer. Pump 130 was set at about 10 grams/min feed rate and the black fertilizer solution was fed for about 80 minutes. When a temperature about 580° F. and 400 psig were achieved gas began evolving from the liquid product being received in receiver 170 this indicated that the oxidizer nitric acid was reacting with the carbon impurity to produce oxides of nitrogen, water and carbon dioxide. At this time, 49 minutes after feeding the fertilizer and oxidizer solution, the reactor solution was still black even with gas evolution indicating partial reaction. At 55 minutes the temperature in the reactor was about 590° F. and 400 psig and reactor effluent became colorless and was odorless. This run was continued for 25 more minutes yielding clear, colorless 10-34-0 fertilizer solution. Thus oxidation of the carbon floc was demonstrated in a laboratory system which simulated a commercial operation.

Table II gives a summary of this laboratory test.

TABLE II

| Ten Minutes | Reactor Temperature °F. | Pressure Psig | Product Effluent Collected gms | Comments |
|---|---|---|---|---|
| Prerun | | | | |
| 0 | 70 | 400 | | Prerun of 100% H$_2$O Feed, Air |
| 10 | 70 | 400 | | purge of system completed |
| Run | | | | |
| 0 | 70 | 400 | | Began to feed 10-34-0 solution |
| 0 | 170 | 400 | | containing nitric acid |
| 4 | 170 | 400 | | |
| 13 | 480 | 400 | | |
| 16 | 530 | 400 | | |
| 20 | 560 | 400 | 76 | Gas evolution began |
| 24 | 580 | 400 | 121 | Pressure variation with gas |
| 28 | 580 | 400± | 169 | Evolution |
| 34 | 585 | 400± | 227 | Erratic pressure |
| 37 | 340 | 400± | 265 | Furnace voltage was reduced |
| 43 | 400 | 400± | — | |
| 49 | 580 | 400± | 405 | Black product & gas evolved |
| 51 | 590 | 400± | 432 | |
| 55 | 590 | 400± | 488 | Clear odorless effluent & gas evolved |
| 62 | 572 | 400± | 561 | Clear odorless effluent & gas evolved |
| 65 | 610 | 400± | 593 | Clear odorless effluent & gas evolved |
| 80 | 630 | 400± | 770 | Clear odorless effluent & gas evolved |
| 85 | 640 | 400± | 770 | Feed was depleted |

I claim:

1. A method for removing carbon floc from wet-process phosphoric acid during the conversion of said acid to liquid fertilizer by neutralization with ammonia, said method comprising contacting said wet-process phosphoric acid with ammonia in a pipe reactor at an elevated temperature in the range of about 400° to about 700° F. in the presence of insert therefore, "a sufficient amount of oxidizing agent to provide a colorless solution." a sufficient amount of oxidizing agent to provide a colorless solution.

2. A method for removing carbon floc from liquid fertilizer produced from a wet-process phosphoric acid by neutralization with ammonia, said method comprising contacting said liquid fertilizer with ammonia in a pipe reactor at an elevated temperature in the range of about 400° to about 700° F. in the presence of a sufficient amount of oxidizing agent to provide a colorless solution.

3. A method of claim 1 or 2 wherein the reactant containing carbon floc is mixed with the oxidizing agent prior to contact with ammonia.

4. A method of claim 1 or 2 wherein said oxidizing agent is nitric acid.

5. A method of claim 3 wherein said oxidizing agent is nitric acid.

* * * * *

UNITED STATES PATENT AND TRADEMARK OFFICE
CERTIFICATE OF CORRECTION

PATENT NO. : 4,420,321

DATED : December 13, 1983

INVENTOR(S) : Joseph F. Wilson

It is certified that error appears in the above-identified patent and that said Letters Patent is hereby corrected as shown below:

Claim 1, lines 51-53, delete: "insert therefore, "a sufficient amount of oxidizing agent to provide a colorless solution."

Signed and Sealed this

Fifteenth Day of May 1984

[SEAL]

Attest:

GERALD J. MOSSINGHOFF

Attesting Officer

Commissioner of Patents and Trademarks